United States Patent [19]

Grimsley

[11] 4,021,524

[45] May 3, 1977

[54] METHOD OF MAKING A COLLAPSIBLE TUBE WITH AN INTEGRAL CAP

[75] Inventor: Arvid Kjellsen Grimsley, Stamford, Conn.

[73] Assignee: American Can Company, Greenwich, Conn.

[22] Filed: Aug. 15, 1975

[21] Appl. No.: 604,937

[52] U.S. Cl. .............................. 264/242; 264/262; 264/267; 264/271; 264/328; 264/DIG. 41
[51] Int. Cl.² ..................... B29C 27/00; B29F 1/00
[58] Field of Search .......... 264/242, DIG. 41, 261, 264/262, 328, 267, 271; 222/107, 92; 215/250–253

[56] References Cited

UNITED STATES PATENTS

| 2,945,266 | 7/1960 | Mainardi | 264/DIG. 41 |
| 3,260,777 | 7/1966 | Brandt | 264/262 |
| 3,263,013 | 7/1966 | Morin | 264/242 |
| 3,330,006 | 7/1967 | Jenkins | 264/DIG. 41 |
| 3,565,293 | 2/1971 | Schultz | 222/107 |
| 3,599,837 | 8/1971 | Anderson | 222/107 |
| 3,673,761 | 7/1972 | Leitz | 215/253 |

*Primary Examiner*—Willard E. Hoag
*Attorney, Agent, or Firm*—Robert P. Auber; Ira S. Dorman; George P. Ziehmer

[57] ABSTRACT

A method of making a normally closed, tamper-resistant container having a body, a nozzle insert extending outwardly from an opening of the body, and an integrally-formed closure member molded upon the insert and covering substantially the entire exterior surface and the outer end of the outlet passage thereof. The closure member includes a manually-rupturable connecting section extending thereabout and dividing it into a removable cap portion and a fixed breast portion, which joins the insert to the body. A method for fabricating the container is provided.

5 Claims, 9 Drawing Figures

METHOD OF MAKING A COLLAPSIBLE TUBE WITH AN INTEGRAL CAP

BACKGROUND OF THE INVENTION

Squeeze tubes and other containers for dispensing liquids, pastes, gels, ointments and the like, and methods for the manufacture thereof, are of course well known in the art. Typically, such containers consist of a collapsible tubular body, a molded nozzle insert, and a closure cap, all of which are usually separately formed and subsequently assembled. While they are highly satisfactory and in widespread use, the separate forming and assembly operations employed tend to be expensive and time-consuming. In addition, current consumer-protection and child-safety concerns have given rise to a considerable demand for "child-proof" and tamper-resistant containers.

Various techniques (exemplary of which are those described in U.S. Pat. No. 3,330,006 and United Kingdom Specification No. 1,010,541) have sought to improve upon the economics and rates of production of containers of the sort herein involved. Moreover, a wide variety of structures affording resistance to the unauthorized removal of closures have been proposed. However, as far as is known, no presently-available container affords the advantages of that of the instant invention, nor lends itself to production by the highly facile and economic method herein set forth.

Accordingly, it is an object of the present invention to provide a novel dispensing container which lends itself to economical, high-speed fabrication.

It is also an object of the invention to provide such a container which is tamper-resistant and/or child-proof.

Another object is to provide a novel and facile method for the fabrication of a container having the foregoing features and advantages.

A more specific object of the invention is to provide a novel method for the fabrication of a tamper-resistant container comprised of a collapsible tubular body, a nozzle insert, and a closure cap wherein the closure cap is integrally formed with means for securing the insert to the end of the body.

SUMMARY OF THE INVENTION

It has now been found that certain of the foregoing and related objects of the invention are readily attained in a normally closed, tamper-resistant container including a body having an opening therein, a nozzle insert, and a closure member. The nozzle insert has at one end a neck portion extending outwardly from the opening of the body and providing an outlet passage therefrom, and has at the opposite end thereof a shoulder portion with a peripheral element lying at least partially within the body. The closure member is integrally formed, and is molded upon the insert to cover substantially the entire exterior surface and the outer end of the outlet passage thereof. A manually rupturable connecting section extends about the closure member, and divides it into a removable cap portion on the neck portion of the insert and a fixed breast portion on the insert shoulder portion. The breast portion thereby provided is at least in part disposed between the peripheral element of the insert and the body, to sealingly join those parts together.

In a preferred embodiment, the breast portion extends about and enfolds the edge of the peripheral element, to grip the edge and thereby enhance the security of interengagement therebetween. The closure member is desirably fabricated from a material which is substantially nonadherent to the insert, while being capable of fusing to the body. Most desirably, the nozzle insert is molded from a synthetic thermosetting resinous material, such as urea formaldehyde, with the closure member being molded from a synthetic thermoplastic resinous material, such as polyethylene.

In the particularly preferred embodiments, the container includes a body which is deformable and tubular in configuration, and the nozzle insert has an outwardly-tapered, externally threaded neck portion with an inwardly-disposed flared shoulder portion. The shoulder portion of the nozzle insert may advantageously be configured to provide means for mechanically engaging the breast portion of the closure member, so as to better resist separation therefrom. In such a case, the outer surface of the shoulder portion may be corrugated or, alternatively, at least one notch may be formed in the peripheral edge of the shoulder portion. The rupturable connecting section may advantageously comprise a circumferential band of reduced cross-section relative to the adjacent portions of the closure member. Alternatively, it may be provided by at least one rib extending between the cap portion and breast portion, and constituting substantially the only connection therebetween.

Certain objects of the invention are attained in a method for the production of a closed container of the foregoing general description. The method includes, as an initial step, at least partially disposing within a mold cavity a body having an opening therein, with at least the opening-defining edge portion thereof contacting the surface of the cavity. A nozzle insert, having a neck portion at one end (providing an outlet passage) and a shoulder portion with a peripheral element at the opposite end thereof, is disposed within the mold cavity with the neck portion extending outwardly from the body into the mold cavity and with the peripheral element within the body and in spaced-apart, proximate relationship to the edge portion thereof, the insert being spaced from the cavity surface to define a closure-forming space therebetween. Thereafter, a flowable resinous material is introduced into the closure forming space to provide a quantity of the material over at least substantially the entire outer surface of the insert and the outer end of the outlet passage thereof, to cover the insert therewith. Finally, solidification of the resinous material is effected, to provide an integrally-formed closure member having a cap portion on the neck portion of the insert, and a breast portion on the shoulder portion thereof. The breast portion sealingly joins the peripheral element of the shoulder portion of the insert to the body; since the resinous material is selected to be relatively non-adherent to the insert when solidified, separation of the cap portion from the nozzle portion thereof may conveniently be achieved.

Preferably, the method additionally includes the step of forming a section of at least reduced strength at least partially about the closure member between the cap portion and breast portion thereof, to permit the manual separation and removal of the cap portion from the neck portion of the insert. Such a forming step is desirably effected by circumferentially scoring the closure member. It is especially desirable for the closure-forming space between the insert and the cavity to extend about and under the periphery of the shoulder portion of the insert; upon introduction of the resinous material thereinto, it will flow about and enfold the edge of the peripheral element of the insert, so as to grip the edge upon solidification and thereby enhance the security of interengagement therebetween. Generally, the step of introducing the resinous material will be effected by injection.

DETAILED DESCRIPTION OF THE ILLUSTRATED EMBODIMENTS

Turning now in detail to the appended drawings, FIGS. 1–3 and 5 thereof illustrate a tamper-resistant container embodying the invention. The container includes a tubular body 12, a one-piece nozzle insert, generally designated by the numeral 14, extending from the body 12, and a closure member, generally designated by the numeral 20, molded upon the insert 14 and joining it to the body 12.

Figure 4:
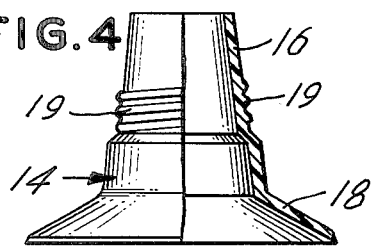
FIG. 4 is an elevational view, in partial section, of the nozzle insert employed in the containers of the foregoing figures, drawn to a scale slightly enlarged from that of FIG. 1.

As can best be seen in FIG. 4, the nozzle insert 14 has an outwardly-tapered neck portion 16 and an inwardly-disposed, flared shoulder portion 18. A passageway 17 extends through the insert 14, and a threaded section 19 is provided at an intermediate location on the neck portion 16 thereof.

The closure member 20 conforms substantially to the exterior configuration of the nozzle insert 14; it extends over the entire outer surface thereof, and has an end portion 21 normally overlying and closing the outer end of the passageway 17 of the insert 14. The inner portion 26 of the closure member 20 extends about and enfolds the edge of the shoulder portion 18 of the insert 14, thus providing secure interengagement therebetween and preventing inward displacement of the insert 14. The inner portion 26 also lies between the overlapping margins of the shoulder portion 18 and the edge 23 of the body 12, thus acting as a bridge therebetween and serving to sealingly join the body 12 and the insert 14 to one another.

A circumferential score or groove 25 extends entirely about the closure member 20, thereby dividing it into a cap portion 22 and a breast portion 24. The depth of the groove 25 is less than the thickness of the closure member 20 at that location; consequently, it provides a weakened section, while nevertheless maintaining the integrity of the closure member 20. Groove depth is controlled to require the application of moderate manual twisting force upon the cap portion 22 to enable its separation from the breast portion 24, thus providing a tamper-resistant and child-proof closure.

Figure 3:
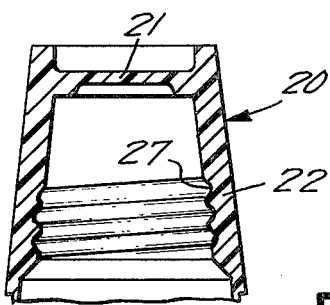
FIG. 3 is a view similar to that of FIG. 2, but in partial section and showing the cap portion of the closure member separated from the breast portion thereof, and removed from the nozzle insert.

It will be appreciated that the materials from which the nozzle insert 14 and closure member 20 are fabricated will be selected to ensure that undue bonding does not occur therebetween upon molding of the closure member 20, since that would hamper appropriately facile separation. It will also be appreciated that, since the closure member 20 is molded directly upon the nozzle insert 14, it will have an internally threaded section 27 corresponding to section 19 of the insert 14. Hence, upon disconnection of the portions of the closure member 20, the cap portion 22 can be removed from the neck portion 16 of the insert 14, and thereafter threadably reassembled therewith. The removed condition of the cap portion 22 is illustrated in FIG. 3.

Figure 1:
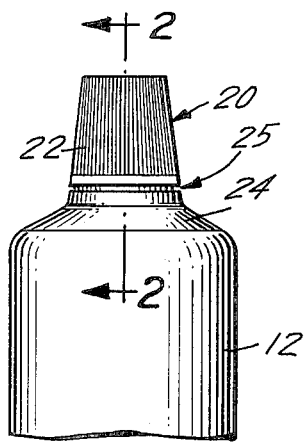
FIG. 1 is a fragmentary elevational view of the upper portion of a container embodying the present invention.
Figure 2:
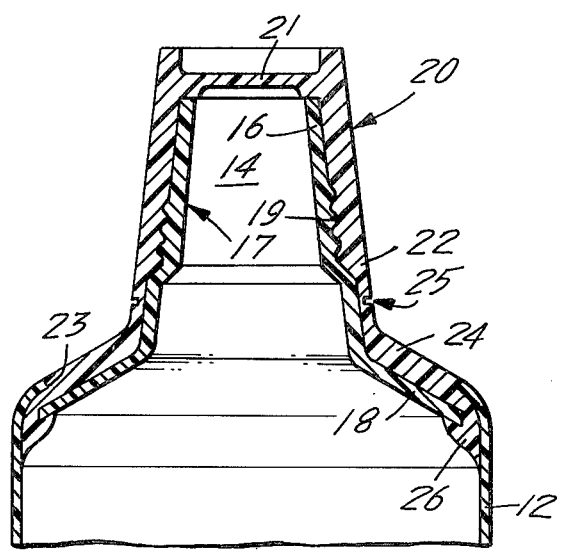
FIG. 2 is a cross-sectional view taken along line 2—2 of FIG. 1, and drawn to an enlarged scale.
Figure 5:
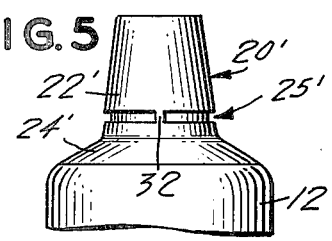
FIG. 5 is a fragmentary elevational view of the upper portion of a second container embodying the invention.

FIG. 5 illustrates a slight modification of the container of the previous figures, which resides in the nature of the weakening section defining the two parts of the closure member, generally designated by the numeral 20'. In this instance, a channel 25' is formed completely through the closure member 20', but extends about less than the entire circumference thereof, to leave a short rib 32 as an interconnection between the cap portion 22' and the breast portion 24' thereof. As can be appreciated, the rib 32 serves to discourage unauthorized removal of the cap 22, and a plurality thereof may be provided, if so desired.

Since the container of the present invention will generally have closure members which provide caps that are threadably engaged, and thus removable by twisting, it will often be desirable to provide means to enhance the security of engagement between the inserts and the bodies thereof. While this may be accomplished in a number of ways, preferably the shoulder portion of the nozzle insert will be configured to increase the mechanical interference between it and the molded breast portion of the closure member and/or the corresponding portion of the body. Two appropriate constructions are illustrated in FIGS. 6 and 7, respectively.

Figure 6:
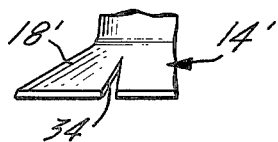
FIG. 6 fragmentarily illustrates a nozzle insert having a shoulder portion configured to enhance engagement with the body of the container in which it may be employed.
Figure 7:
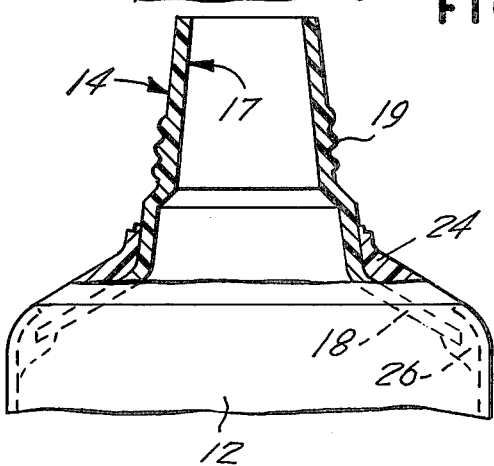
FIG. 7 fragmentarily illustrates a nozzle insert having a somewhat differently configured shoulder portion affording enhanced engagement.
Figure 7:
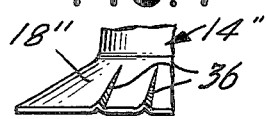

In FIG. 6, shoulder portion 18' of the insert 14' has a notch 34 extending inwardly from its peripheral edge. The resin employed to form the closure member will accordingly flow into the notch 34, and form a mechanical interlock with the insert 14', providing a high measure of resistance to disengagement under twisting forces. In FIG. 7, the shoulder portion 18" of the insert 14" is provided with a series of radially-extending corrugations 36. As will be readily appreciated, these function as mechanical interlocks in much the same manner as does the notch 34 of the preceeding figure. It will also be appreciated that, although only one notch and two corrugations are shown in the foregoing figures, a multiplicity thereof may be spaced about the respective shoulder portions, to afford optimum levels of engagement.

Figure 8:
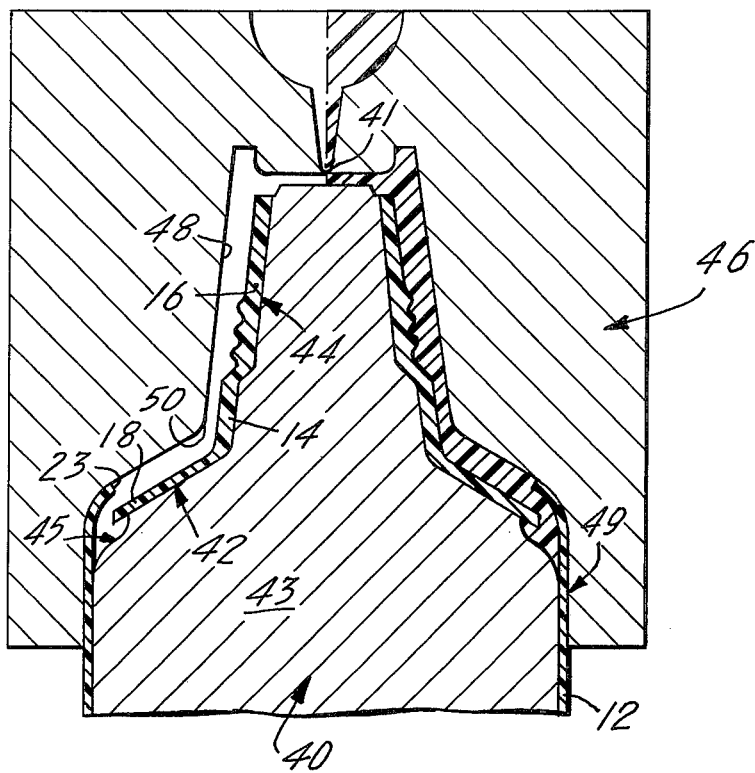
FIG. 8 is a cross sectional view, drawn to the scale of FIGS. 2 and 3 and diagrammatically showing, in use, tooling suitable for molding the closure member of the container of FIGS. 1–3 and 5, the left and right sides of the figure illustrating conditions prior and subsequent to resin introduction, respectively.
Figure 9:
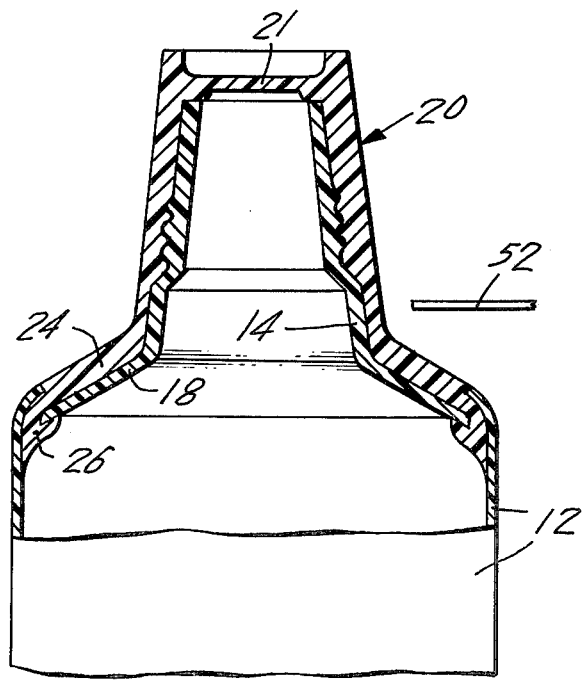
FIG. 9 is a fragmentary view, in partial section, of the upper portion of the container produced with the tooling of FIG. 8, prior to the formation of a rupturable connecting section thereabout.

Referring now to FIGS. 8 and 9, therein illustrated is typical apparatus suitable for use in fabricating containers of the invention, in accordance with the instant method. Initially, it should be noted that, for the purpose of clarity in describing the relationships between the molding apparatus and the preformed container parts, FIG. 8 depicts two stages of the closure member forming sequence. In practicing the method, the tubular body 12 is first disposed on the cylindrical body 43 of a male die member 40, which member has at one end a frustoconical shoulder portion 42 and an outwardly-extending tapered neck portion 44; the member 40 is dimensioned and configured to seat the nozzle insert 14 thereon, with close conformity therebetween. An undercut or recessed surface provides an annular relief area 45 between the cylindrical body 43 and the shoulder portion 42 of the mandrel 40, the area 45 being so configured that the edge of the shoulder portion 18 of the insert 14 projects substantially therebeyond.

The mandrel 40, with the body 12 and the insert 14 disposed thereon, is then placed into the cavity of a unitary female mold 46. The cavity has an inner portion 48 which is configured to define the exterior surface of the closure member 20, and an outer portion 49 which is adapted to seat the end of the body 12 therein. The juncture between the inner and outer portions 48, 49 of the cavity is curved to cause the edge 23 of the tubular body 12 to curl inwardly slightly, to thereby ensure intimate contact between the body 12 and the surface of cavity portion 49. In this position, the cavity surfaces cooperate with body 12, insert 14 and mandrel 40 to define a closure member-forming space 50. A quantity of flowable, synthetic resinous material is injected from an external pressurized source (not shown) through gate 41, so as to completely fill the closure member space 50 therewith, and form the desired closure member 20. It will be noted that the resinous material flows about and under the edge of the insert 14, forming in the relief area 45 of the member 40 the inner portion 26 of the closure member 20, which serves, upon solidification, to securely seal the body 12 and insert 14 to one another.

After withdrawal of the mandrel 40 from the female mold 46, with the formed container thereon, a scoring tool 52, as shown in FIG. 9, may be used to form a groove or channel (illustrated as 25 in FIG. 2 and as 25' in FIG. 5), thereby providing a weakened, manually-rupturable section about the respective closure member 20, 20'. Alternatively, a segmented or otherwise appropriately configured female mold (not shown) could be used to directly form such weakening portions during the molding operation.

It should be noted that, due largely to shrinkage in the resin used to form the closure member 20, upon solidification, a precise, intimate and tight-fitting relationship is achieved between the closure member 20 and the insert 14. While advantageous in terms of preventing contamination of its contents, since a highly effective seal is formed, such a tight fit also tends to make cap removal difficult. For this reason, the mating sections of the closure member 20 and insert 14 are tapered; in particular, the taper of the threaded sections 19, 27 permit loosening to occur readily upon slight twisting of the cap portion 22. The proper choice of materials for fabrication also assists in facile opening after disconnection of the portions of the member 20.

As will be appreciated by those skilled in the art, the body 12 may be fabricated from a single synthetic resinous material, or it may be made of a blended or laminated combination of two or more materials. The choice will depend largely upon the intended contents of the container, in light of which, laminates affording a desirable combination of properties will often be most advantageous; of course, the laminate may include substances other than resins, such as paper, metal foil, adhesives, and the like. In any event, however, the inner layer, and preferably also the outer layer, should be made of a thermoplastic resinous material which is capable of fusing and bonding to the material from which the closure member 20 is molded. Exemplary resins include the olefin polymers, polymers of the ethylenically-unsaturated aromatic hydrocarbons, vinyl and vinylidene chloride polymers and copolymers, etc.

The nozzle insert is made from a material which is not subject to undue softening or fusion under the temperature and pressure conditions selected for the molding operation, and typically it will be fabricated from a thermosetting resin, such as urea formaldehyde. However, other synthetic resins, either thermosetting or thermoplastic, may be used for the insert, and it may be made entirely or partially of metal, depending again largely upon the nature of the product.

Thus, it can be seen that the present invention provides a novel dispensing container that is tamper-resistant and/or child-proof, and which lends itself to economical, high speed fabrication. It also provides a novel and facile method for fabricating a container having the foregoing features and advantages. More particularly, a container is afforded which is comprised of a collapsible tubular body, a nozzle insert, and a closure cap, wherein the closure cap is integrally formed with means for securing the insert to the end of the body.

What is claimed is:

1. In a method for the production of a closed container having a body, an insert having a shoulder portion and a neck portion providing an outlet passage therefrom, and a cap for the insert, the steps comprising:

at least partially disposing within a mold cavity a body having an opening therein, with at least the edge portion thereof defining said opening being in contact with the surface of said cavity;

disposing a nozzle insert, having an externally threaded neck portion at one end providing an outlet passage and a shoulder portion with a peripheral element at the opposite end thereof, within said mold cavity with said neck portion extending-outwardly from said body into said mold cavity, and with said peripheral element within said body and in spaced-apart, proximate relationship to said edge thereof, said insert being spaced from said cavity surface to define a closure-forming space therebetween;

introducing into said closure-forming space a flowable resinous material to provide a quantity of said material over at least substantially the entire outer surface of said insert and the outer end of said outlet passage thereof, to cover said insert therewith; and effecting the solidification of said resinous material to provide an integrally-formed closure member having a cap portion on said neck portion and a breast portion on said shoulder portion, with said breast portion sealingly joining said peripheral element of said shoulder portion to said body, said material, when solidified, being relatively nonadherent to threads of said insert to permit separation of said cap portion from said nozzle portion thereof.

2. The method of claim 1 additionally including the step of forming a section of at least reduced strength at least partially about said closure member between said cap portion and said breast portion, to permit the manual separation thereof and the removal of said cap portion from said neck portion of said insert.

3. The method of claim 2 wherein said section-forming step is effected by circumferentially scoring said closure.

4. The method of claim 1 wherein said step of introducing said resinous material is effected by injection thereof.

5. The method of claim 1 wherein said closure-forming space extends under and about the periphery of said shoulder portion of said insert, so that said resinous material introduced thereinto flows about and enfolds the edge of said peripheral element of said insert, to grip said edge upon solidification and thereby enhance the security of interengagement therebetween.

* * * * *